March 3, 1959 R. L. SINK 2,876,004

SPEED MEASUREMENT AND CONTROL

Filed July 12, 1956 2 Sheets-Sheet 1

INVENTOR.
ROBERT L. SINK
BY
Christie, Parker & Hale
ATTORNEYS

March 3, 1959 R. L. SINK 2,876,004

SPEED MEASUREMENT AND CONTROL

Filed July 12, 1956 2 Sheets-Sheet 2

INVENTOR.
ROBERT L. SINK
BY
Christie, Parker & Hale
ATTORNEYS

United States Patent Office 2,876,004

Patented Mar. 3, 1959

2,876,004

SPEED MEASUREMENT AND CONTROL

Robert L. Sink, Altadena, Calif., assignor to Consolidated Electrodynamics Corporation, Pasadena, Calif., a corporation of California Application July 12, 1956, Serial No. 597,540

6 Claims. (Cl. 271—2.3)

Figure 1:
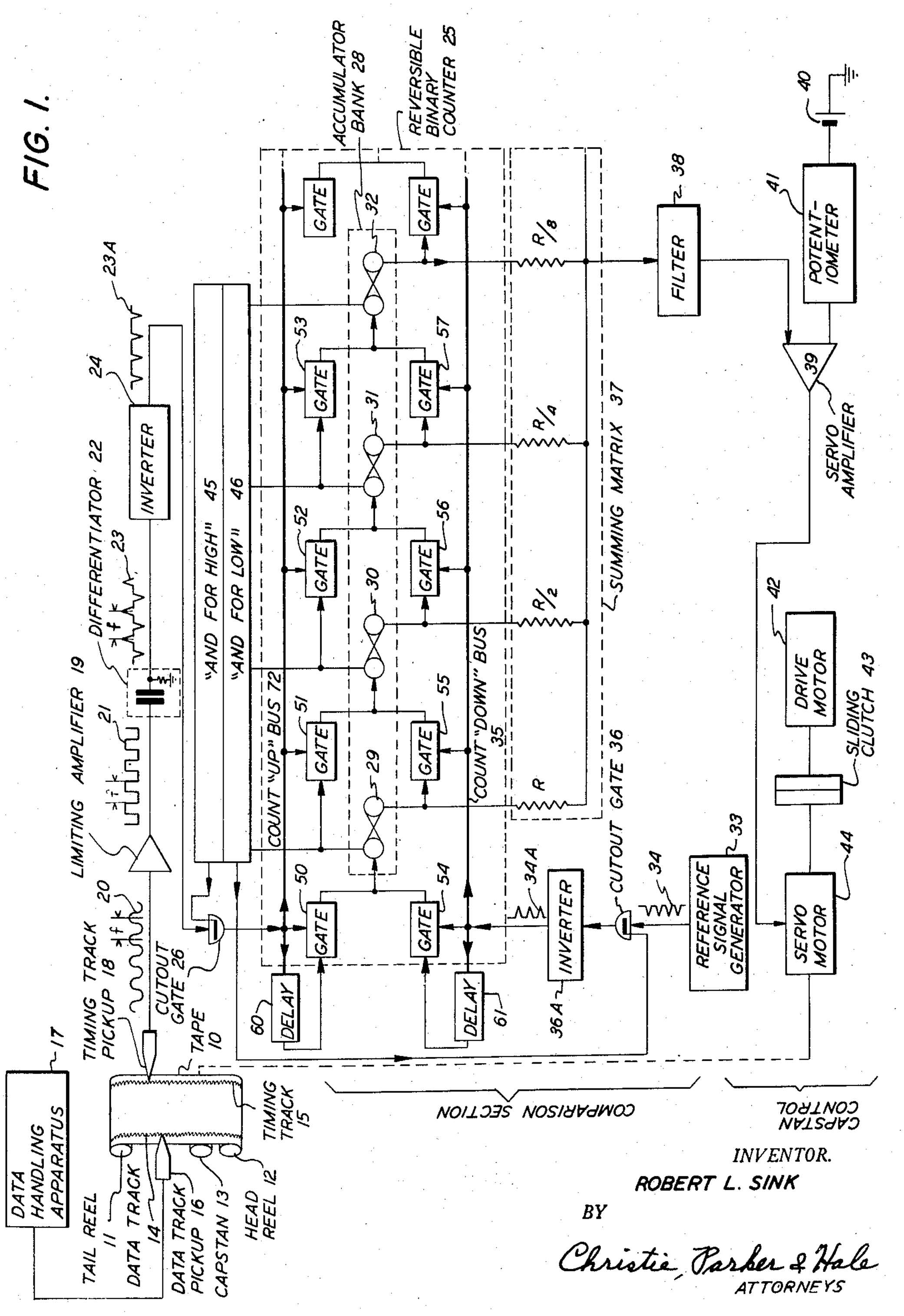

This invention is concerned with measurement and control of speed of a moving body, say a rotating shaft or a tape moving lengthwise from one reel to another. It provides means for comparing the speed of the body with a standard and for determining the difference, positive or negative, between the two. In its preferred form the output of the comparison means is employed to control a servo-system which in turn controls the speed at which the body is moving. The invention finds major application in the servo-control of a precision data handling system in which a magnetic tape having signals representative of the data to be handled is played back, but has more general application, as already indicated.

In automatic data handling, it is customary to record the data to be analyzed on magnetic tape and then to play the tape back through an electronic system which analyzes the data or utilizes it in computations made automatically within the system. The tape should be played back at precisely the same speeds at which it moved during initial recording. Since it is difficult, if not impossible, to move the tape at a constant speed during initial recording, it has become customary to record on the tape a timing track (produced by an oscillator of high accuracy) side by side with the data tracks during the initial recording, and then to utilize this timing track to control the speed of the tape during play-back so as to reproduce as accurately as possible the original instantaneous tape speeds.

To accomplish this result, four elements are employed:

(1) Means for recovering from the timing track the original high accuracy signal of the timing oscillator;

(2) A second oscillator of high accuracy. This produces a reference signal for comparison with that recovered from the timing track;

(3) A comparison circuit which puts out a signal representative of differences between the frequencies of the timing track signal and the reference signal; and (4) An electromechanical servo-system which controls the speed of the tape play-back in response to the signal from the comparison circuit.

The instant invention provides a distinctive comparison circuit which offers a number of advantages as compared with most such circuits presently available. Among these advantages are:

(1) In play-back, the speed of tape during original recording can be duplicated within a timing accuracy of substantially less than one millisecond over an unlimited period of time.

(2) The circuit ignores certain random forms of noise, with the result that there is an improved signal-to-noise ratio.

(3) The comparison circuit is such that it can examine over a considerable period of time the accumulated difference between the reproduced timing track signal and the reference signal from the comparison oscillator and then put out a signal which, through the servo-system, will restore proper tape velocity during play-back.

In sum, my invention contemplates apparatus for comparing the frequencies of two pulse trains. The apparatus has a reversible binary counter with a plurality of reversible bi-stable counting elements, a count-up bus connected in parallel to the respective elements from one side, a count-down bus connected in parallel to the ele- elements from the other side, means for supplying one pulse train to one of the buses, means for supplying the other pulse train to the other bus, and a summing matrix comprising individual resistances corresponding in number and respectively connected to the outputs of the individual elements for producing an output proportional to the difference in the number of pulses in the trains introduced into the counter in unit time.

The practice of my invention, as applied to the control of play-back speed of magnetic tape, the timing track signal on the tape is picked up during play-back. The signal thus recovered is converted into a series or train of pulses. For example, the recovered timing track signal may be amplified, limited, squared and differentiated to produce the required series of spaced pulses corresponding in frequency to the signals from the timing track. The pulse series is then fed into one side of a reversible binary counter, the other side of which receives a series of pulses from a reference oscillator, or the like, of high accuracy. The reversible binary counter has a counting chain or accumulator. While the frequency of the pulses representative of the signals from the timing track is higher than the frequency of the reference pulses, the net count stored in the counting chain will gradually increase at the rate of one count per second for each half-cycle per second difference in frequency. In the reverse situation, the net count in the counting chain will gradually decrease at the same rate. The count stored in the counting chain or accumulator at any instant is summed in a matrix which provides an output signal that varies in stair-step fashion and is determined by the difference in frequency of the two series of pulses being compared. This output signal is employed to control a servo-system which runs a capstan which drives the played-back tape, so that the tape is played back at substantially the same speed at which it is recorded.

In the preferred form of my reversible binary counter there is a "count-up" bus and a "count-down" bus. The series of pulses from the tape is applied to the "count-up" bus. The series of pulses from the reference oscillator is applied to the "count-down" bus. The two buses control a summing matrix the output of which represents the difference in the number of counts stored in the two buses at any instant.

The preferred form of my counter is also provided with cut-out switches or gates respectively between the reference oscillator and the "count-down" bus and between the tape pick-up and the "count-up" bus. The cut-out switch or gate on the lead to the "count-up" bus is set to open when the maximum capacity of the counter is reached. Similarly, the cut-out switch or gate on the lead to the "count-down" bus is set to open when the minimum capacity of the counter is reached. The cut-out switches or gates thus prevent sudden reversal of the controlling signal from the counter when its capacity is exceeded. In consequence, there are no limits to the "pull-in" characteristics of the system because there is an absolute limit to the signals from either side of the counter with no reversal of contrasting signal for extreme differences of frequencies between the two pulse series.

During steady-state conditions when the frequencies of the two pulse series fed to the reversible binary counter are the same, the count in the accumulator will increase and decrease by one count per cycle with the average accumulated at the summing matrix output remaining constant.

The weighted output potential from the summing matrix preferably is compared with (i. e. subtracted from) a D. C. reference potential, which may be adjusted up or down to a desired level. This, in effect, permits shift in the midpoint of the accumulator so that the steady-state operation of the accumulator can be adjusted to occur in the middle of its operating range.

The resultant potential from the comparison or subtraction operation (involving the introduction of the arbitrary D. C. level) is amplified in conventional equipment and applied to drive a servo-motor. Preferably this is an auxiliary motor coupled to a main constant-speed drive motor through a sliding clutch. In this fashion the main driving force for the capstan on the tape transport apparatus is supplied by the main drive motor, while the smaller servo-motor controls the capstan speed.

Figure 2:
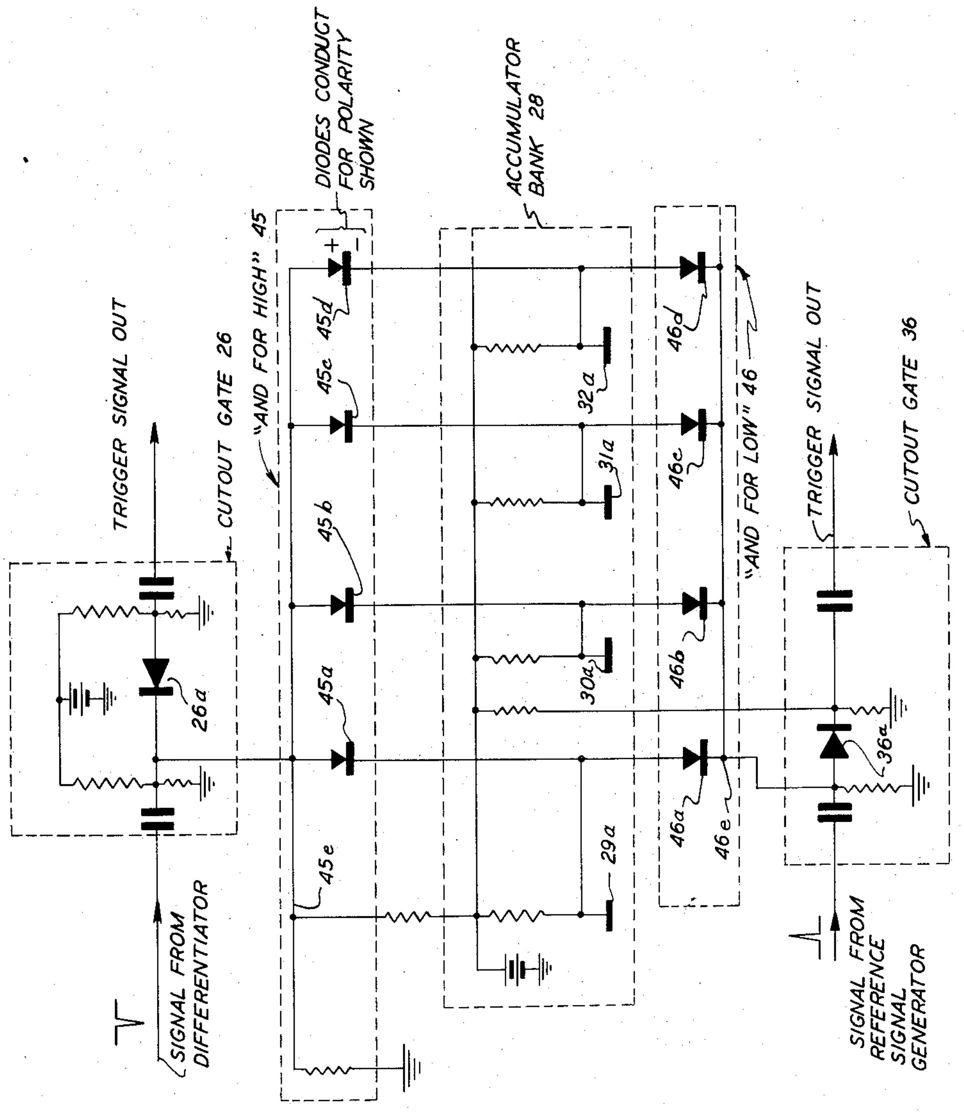

These and other aspects of my invention will be more thoroughly understood in the light of the following detailed description of a presently preferred form of the apparatus. The description is illustrated by the following drawings in which:

Fig. 1 is a schematic wiring diagram of a servo-system constructed in accordance with the invention and applied to the control of the speed of magnetic tape play-back; and Fig. 2 is a wiring diagram showing details of the electronic cut-out gates, of Fig. 1, and the "And for high" circuit and the "And for low" circuit.

Referring to Fig. 1, a magnetic tape 10 is wound from a tail reel 11 to a head reel 12, with the tape being driven at a controlled speed by a capstan 13. Data to be processed previously has been recorded on the tape along a data track 14 and at the same time a timing track 15 was recorded on the track by a device such as an accurate oscillator operating at substantially constant frequency. Accordingly, the timing track constitutes an index of the speed at which the tape was travelling at any instant during the initial recording of the data. The train of signals represented by the data track is recovered by a conventional data pickup head 16, say a ferritte core, disposed in magnetizable relationship with the track, and sent to data processing apparatus 17, for example an electronic computer. Similarly the train of signals represented by the timing track is picked up by a timing track pickup 18 and fed to a limiting amplifier 19 which, in effect, amplifies the sine waves 20 of frequency *f* recovered from the timing track and chops off their positive and negative peaks to leave stubs constituting a square wave signal 21 of the same frequency *f*. The signal series from the limiting amplifier is fed to a differentiator 22, where the square wave forms are shaped into alternating and separated sharp negative and positive pulses, the result being the wave train 23, again of frequency *f*.

The train of sharp pulses from the differentiator is applied to an inverter 24 which causes all of the pulses to be negative-going pulses as shown by the pulse train 23A. This pulse train is fed to one side, say the forward side, of a reversible binary counter 25 through a cut-out gate 26 which acts as a valve or gate and is actuated as described below. As long as the circuit through the cut-out gate 26 is closed, the pulse train flows through to a "count-up" bus 27 of the reversible binary counter. The "count-up" bus is connected in parallel with an accumulator bank 28 of bi-stable multivibrators 29, 30, 31, 32, or equivalent bi-stable devices.

A four stage binary counter 25 is shown in the drawings. It will be apparent that substantially any desired number of stages may be employed depending upon the amount of control action which is required.

A reference signal generator 33 supplies a reference train 34 of spaced, sharp pulses to a "count-down" bus 35 of the reversible binary counter through a second cut-out gate 36 and an inverter 36A. The inverter 36A provides pulses 34A of negative polarity which are similar to the pulses 23A which are derived from the timing track. To minimize regulation, the reference signal generator should operate at substantially the same frequency as the oscillator that was employed to impress the timing track on the magnetic tape.

The outputs of the individual bi-stable multivibrators are connected respectively to the resistances R, R/2, R/4 and R/8 of a summing matrix 37, there being the same number of resistances in the matrix as there are multivibrator sections in the accumulator.

Reversible binary counters of the types contemplated herein are not new per se, for counters of this general type have been described in an article entitled, "The Binary Quantizer," in "Electrical Engineering," November 1949, p. 962, specific reference being made to the section of the article entitled, "The Principle of Forward and Backward Counting."

The summing matrix subtracts pulses from the "count-up" bus from the pulses of the "count-down" bus to arrive at an algebraic sum of pulses. A D.-C. signal having a magnitude which is proportional to this algebraic sum, after passing through a filter 38, is applied to the input of a servo-amplifier 39. This amplifier also receives an adjustable D.-C. reference voltage from a source 40 through a potentiometer 41.

A main drive motor 42, operating at substantially constant speed approximating that required for the capstan, is connected through a sliding clutch 43 to a servo-motor 44, which in turn is connected to the capstan and is controlled by the servo-amplifier. The capstan drives the tape past the pickup heads at the required speed.

The cut-out gates or switches through which the "count-up" and "count-down" buses receive their respective pulse trains are connected to and controlled respectively by an "And for high" section 45 and an "And for low" section 46. These sections, which are described in detail hereinafter, are controlled by the accumulated counts in the counter. When the accumulated count reaches the maximum capacity of the counter, the "And for high" section produces a bias sufficiently high to cause the cut-out gate 26 to become non-conductive, thus interrupting the train of pulses to the "count-up" bus from the tape. Similarly, if the count in the accumulator reaches the minimum capacity of the counter, the "And for low" section produces a bias at the other cut-out gate 36 which interrupts the train of pulses from the reference oscillator to the "count-down" bus.

The principle of "up and down" counting utilized in the reversible binary counter of Fig. 1 requires that all interstage switching connections be interchanged. This is accomplished by the use of gates between stages, these gates being appropriately energized by the "count-up" bus and the "count-down" bus. Thus, four gates 50, 51, 52, 53 are provided respectively between the left hand side of the multivibrators 29, 30, 31, 32 and the inputs of the next succeeding multivibrator stages, and four more gates 54, 55, 56, 57 are provided respectively between the right hand side of the multivibrators 29, 30, 31, 32 and the inputs of the next succeeding multivibrator stages. The gates 50 to 53 are controlled by the count-up bus 27, and the gates 54 to 57 are controlled by the count-down bus 35.

The apparatus of Fig. 1 is also provided with time delay circuits for the signals coming from the two frequency sources, i. e. the tape and the reference signal generator. Thus, a time delay circuit 60 is connected between the cut-out gate 26 and the gate 50, while a second time delay 61 is connected between the cut-out gate 36 and the gate 54. These time delay means assure that the gates are appropriately energized just prior to the occurrence of a pulse to be counted.

The gates 50 to 53 are normally closed, and they are opened momentarily in response to each pulse of the train 23A which is applied to the count-up bus 27. Likewise, the gates 54 to 57 are normally closed, and these gates are opened momentarily in response to each pulse of the train 34A which is applied to the count-down bus 35.

The pulses of the count-up train 23A are applied to the input of the accumulator bank through the delay circuit 60 and the gate 50. In a similar manner, the pulses of the count-down train 34A are applied to the input of the accumulator bank through the delay circuit 61 and the gate 54. Each time that a count-up pulse is applied to the counter, all of the gates 50 to 53 are opened so that the counting action may progress in a forward direction. Each time that a count-down pulse is applied to the counter, the gates 54 to 57 are opened so that the counting action may progress in a reverse direction.

The system of Fig. 1 is designed to assure that the tape moves at the same instantaneous speed during playback that it had during original recording. Accordingly, each half cycle of the signal train on the timing track produces a pulse which is fed through the cut-out gate 26 to one side of the reversible binary counter. As long as neither the maximum nor the minimum capacity of the counter is exceeded, the positive and negative counts will be summed up algebraically in the counter network. If, in a given interval 800 counts are received from the tape and 798 counts from the reference oscillator, the net count will be plus 2, and the summing matrix output will be advanced step-wise to a potential corresponding to this value. This potential will then be added algebraically to the D. C. reference potential and the sum will be applied to the servo-motor.

As long as the counts from the timing track on the tape equal the counts from the reference oscillator, steady-state conditions are maintained. If the counts from the tape in unit time exceed the counts from the reference oscillator in the same time, the output of the summing matrix will be representative of the algebraic sum of the two, and will indicate that the tape is being moved faster than it was when the timing signals being counted were recorded initially. This means that the capstan should be slowed down and the system will operate automatically to bring this about. If the counts from the tape in unit time are fewer than the counts from the reference oscillator in the same time, the situation is reversed; the tape is running too slowly, and the system will be operate automatically to speed it up.

If, for any reason, such as an abrupt change in the speed at which the tape was run during the time that the timing track was made, the capacity of the system to accommodate itself to this change is insufficient, the system will fail to accommodate, but only during the interval that the abrupt change occurs. As soon as conditions are such that the capacity to accommodate change is not exceeded, the system will not be affected by the accumulated errors and will resume proper regulation.

Details of construction and operation of the cut-out gates 26, 36 and the associated "And for high" circuit 45 along with "And for low" circuit 46 are illustrated by Fig. 2.

In the accumulator bank 28 shown in Fig. 1 there are four multivibrator stages 29, 30, 31, 32 each comprising two interconnected vacuum tubes having two plates. In Fig. 2, only one of these plates 29*a*, 30*a*, 31*a*, 32*a*, is shown for each stage. These plates are connected respectively with the cathodes of diodes 45*a*, 45*b*, 45*c*, 45*d* in four stages of the "And for high" circuit 45 and to the anodes of diodes 46*a*, 46*b*, 46*c*, 46*d* in four stages of the "And for low" circuit 46. The anode sides of the diodes in the "And for high" circuit are connected to the cathode of a diode 26*a* in the cut-out gate 26 and the cathode sides of the diodes in the "And for low" circuit are connected to the anode of a diode 36*a* in the cut-out gate 36.

In the following description the words "high" and "low" are used to describe the relative potentials of the plates of each accumulator stage. A "low" state occurs when the half of each stage shown is conducting, to the end that its plate voltage is at relatively low potential. A "high" state occurs when the plate shown in each accumulator stage is not conducting, the voltage at that plate then being relatively high.

A binary zero exists when the plates 29*a*, 30*a*, 31*a*, 32*a*, are in a "low" state, and the accumulator registers "zero" when all of its stages are in "zero" state. Moreover, the common junction point 46*e* of the diodes 46*a*, 46*b*, 46*c*, 46*d* will always be at essentially the highest plate voltage of any of the diodes of the accumulator bank. If all the cathodes of the diodes of this bank are in their "low" state simultaneously, the voltage at the common point will be at the low value of the plate voltage. In other words, if the voltages at the plate 29*a* and at the plate 30*a* and at the plate 31*a* and at the plate 32*a* are in the "low" state, the voltage at the common junction 46*e* will also be in a low state. Hence, the name "And for low" for the circuit.

Conversely, if the voltages at any or all of the plates 29*a*, 30*a*, 31*a*, 32*a* are "high," the voltages at the common junction 46*e* of the plates of the diodes in the "And for low" circuit will also be high.

From the foregoing, the operation of the cut-out gates 26, 36 will be evident. Thus, the diode 36*a* of the cut-out 36 will be conducting as long as the potential at the common point 46*e* is "high." When the cut-out is in this condition, a pluse from the reference signal generator can be transmitted to the accumulator. However, when simultaneous binary zeros occur at all plates 29*a*, 30*a*, 30*b*, 30*c* (with the potentials of diodes 46*a*, 46*b*, 46*c*, 46*d* at "low" values) the diode of the cut-out gate 36 becomes non-conductive and no trigger pulse is transmitted, since the cathode side of this diode 36*a* is biased above the value of the "low" potential.

The "And for high" circuit operates in a somewhat similar manner, but the polarity of the summing diodes is reversed so that the diode 26*a* is biased to be non-conductive only when there is a simultaneous occurrence of binary "ones" at each of the plates 29*a*, 30*a*, 31*a*, 32*a*.

In consequence of the cooperation of the accumulator, the "And for high" circuit, the "And for low" circuit and the two cut-out gates, pulses from the differentiator to the accumulator are prevented from reaching the accumulator whenever the maximum or positive capacity of the system is exceeded and remain cut-off until the positive counts stored in the system are reduced to a value below capacity. Similarly, pulses from the reference oscillator are prevented from reaching the accumulator whenever the minimum or negative capacity of the system matrix is exceeded.

I claim:

1. In apparatus for comparing the frequencies of two pulse trains, the combination which comprises a reversible binary counter having a plurality of reversible bi-stable counting elements, a count-up bus connected in parallel to the respective elements from one side, a count-down bus connected in parallel to the respective elements from the other side, means for supplying one pulse train to one of the buses, means for supplying the other pulse train to the other bus, and means coupled to the outputs of the individual elements for producing an output proportional to the difference in the number of pulses in the trains introduced into the counter in unit time.

2. In apparatus for comparing the frequencies of first and second pulse trains, the combination which comprises a reversible binary counter having a plurality of reversible bi-stable counting elements, a count-up bus connected in parallel to the respective elements from one side, a count-down bus connected in parallel to the respective elements from the other side, means for supplying the first pulse train to one of the buses, means for supplying the second pulse train to the other bus, means coupled to the outputs of the individual elements for producing an output proportional to the difference in the number of pulses in the trains introduced into the counter in unit time, means for automatically interrupting the passage of the first pulse train to the counter when its positive capacity is exceeded, and means for automatically interrupting the passage of the second pulse train to the counter when its negative capacity is exceeded.

3. In apparatus for moving a record having recorded on it a pulse train indicative of the speed at which it was recorded, the combination which comprises a reversible binary counter having a plurality of reversible bi-stable counting elements, a count-up bus connected in parallel to the respective element from one side, a count-down bus connected in parallel to the respective elements from the other side, means for supplying said pulse train to one of the buses, means for supplying a reference pulse train to the other bus, a summing matrix connected to the outputs of the individual bi-stable elements for producing an output proportional to the difference in the number of pulses in the trains introduced into the counter in unit time, means for moving the record, and a servo-motor connected to said record-moving means, the servo-motor being energized by and being responsive to the output of the summing matrix.

4. In apparatus for moving a record again at substantially the speed it had during recording, said record having on it a pulse train indicative of the speed at which it was recorded, the combination which comprises a reversible binary counter having a plurality of reversible bi-stable counting elements, a count-up bus connected in parallel to the respective elements from one side, a count-down bus connected in parallel to the respective elements from the other side, means for suppling said pulse train to one of the buses, means for supplying a reference pulse train to the other bus, and a summing matrix connected to the outputs of the individual bi-stable elements for producing an output proportional to the difference in the number of pulses in the trains introduced into the counter in unit time, a drive motor, a servo-motor, a sliding clutch connected between the drive motor and the servo-motor, record-moving means connected to the servo-motor, and a servo-amplifier having its input connected to the output of the summing matrix and its output connected to the servo-motor.

5. In apparatus for moving a record again at substantially its recording speeds, said record having records thereon, a pulse train indicative of its recording speeds, the combination which comprises a reversible binary counter having a plurality of reversible bi-stable counting elements, a count-up bus connected in parallel to the respective elements from one side, a count-down bus connected in parallel to the respective elements from the other side, means for picking up said pulse train and supplying it to one of the buses, means for supplying a reference pulse train to the other bus, a summing matrix comprising individual resistance corresponding in number and respectively connected to the outputs of the individual bi-stable elements for producing an output proportional to the difference in the number of pulses in the trains introduced into the counter in unit time, a servo-amplifier, means for supplying a D. C. potential to the servo-amplifier, means for superimposing on said D. C. potential the output of the summing matrix, a record-moving means, and a servo-motor driving the record-moving means and energized by the output of the servo amplifier.

6. In apparatus for moving a record again at the speeds it had during recording, said record having recorded thereon a pulse train indicative of said speeds, the combination which comprises a reversible binary counter having a plurality of reversible bi-stable counting elements, a count-up bus connected in parallel to the respective elements from one side, a count-down bus connected in parallel to the respective elements from the other side, means for picking up said pulse train and supplying it to one of the buses, means for supplying a reference pulse train to the other bus, a summing matrix comprising individual resistances corresponding in number and respectively connected to the outputs of the individual bi-stable elements for producing an output proportional to the difference in the number of pulses in the trains introduced into the counter in unit time, record-moving means, a servo-motor connected to the record-moving means, a servo-amplifier having its output connected to the servo-motor and its input connected to the output of the summing material, means for automatically interrupting the passage of the picked-up pulse train to the counter when the positive capacity of the summing matrix is exceeded and means for automatically interrupting the passage of the reference pulse train to the counter when the negative capacity of the summing matrix is exceeded.

References Cited in the file of this patent

UNITED STATES PATENTS

| | | |
|---|---|---|
| 2,705,639 | Lekas | Apr. 5, 1955 |
| 2,732,144 | Jones | Jan. 24, 1956 |